United States Patent [19]

Lunder

[11] Patent Number: 5,704,659
[45] Date of Patent: Jan. 6, 1998

[54] VALVE ADAPTER LOCKING SYSTEM

[75] Inventor: Dennis Lunder, Chula Vista, Calif.

[73] Assignee: Valterra Products, Inc., San Fernando, Calif.

[21] Appl. No.: 703,037

[22] Filed: Aug. 26, 1996

[51] Int. Cl.$^6$ ................................................ F16L 17/06
[52] U.S. Cl. ................................. 285/361; 285/901
[58] Field of Search .................................. 285/360, 361, 285/376, 396, 401, 402, 901

[56] References Cited

U.S. PATENT DOCUMENTS

| | | | |
|---|---|---|---|
| 1,074,706 | 10/1913 | Ferguson | 285/360 X |
| 4,133,347 | 1/1979 | Mercer | 285/402 X |
| 4,708,370 | 11/1987 | Todd | 285/396 X |

FOREIGN PATENT DOCUMENTS

| | | | |
|---|---|---|---|
| 521442 | 3/1931 | Germany | 285/376 |
| 170628 | 10/1921 | United Kingdom | 285/376 |

*Primary Examiner*—Dave W. Arola

[57] ABSTRACT

An apparatus for attaching and securing a cap to a hose adapter used in connection with an RV waste removal valve assembly to prevent inadvertent sewer or waste spillage in the event of a failure of the primary locking components. The apparatus comprises two principal components, including a Y-branch plumbing fitting with a hose adapter incorporated at one end. On the outside surface of the hose adapter are a coupling pin and an adjacently located coupling tongue. The other component is a closure cap, which includes one or more generally L-shaped coupling arms. The coupling arms form a U-shaped opening with the edge of the cap and include an opening at one end to slidably receive the coupling pin and a grooved or slotted portion along the base of the coupling arm near where the arm attaches to the edge of the cap to slidably receive the coupling tongue. The coupling pins and the corresponding open end of the coupling arms are aligned and one or both of these fitting components are rotated towards the other to enable the pins to engage the openings and each of the coupling grooves to engage the corresponding coupling tongues to lock the fittings together.

4 Claims, 3 Drawing Sheets

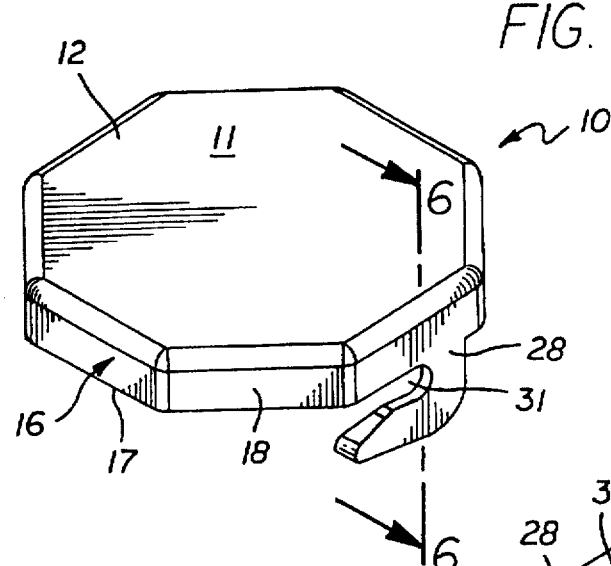
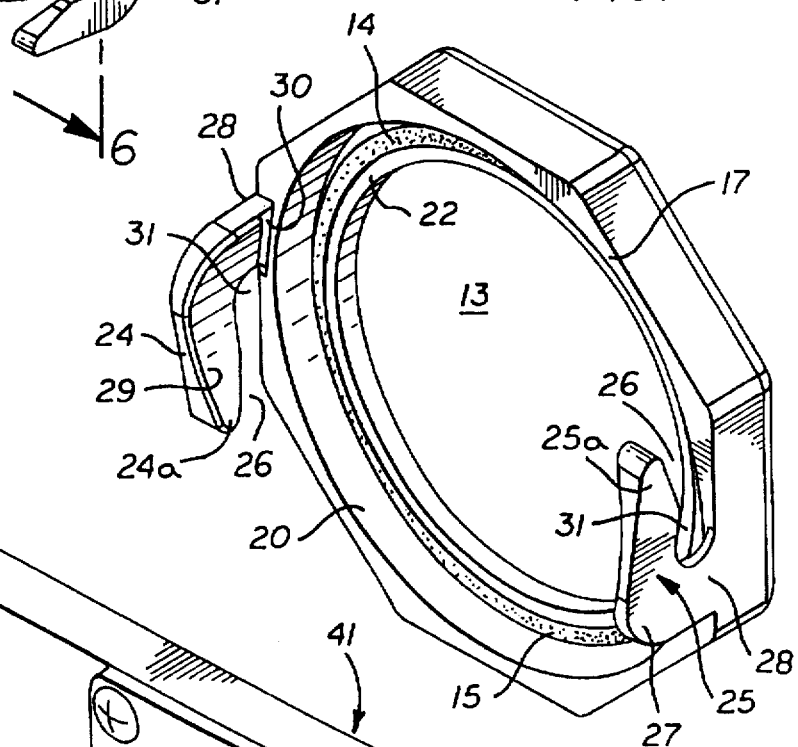
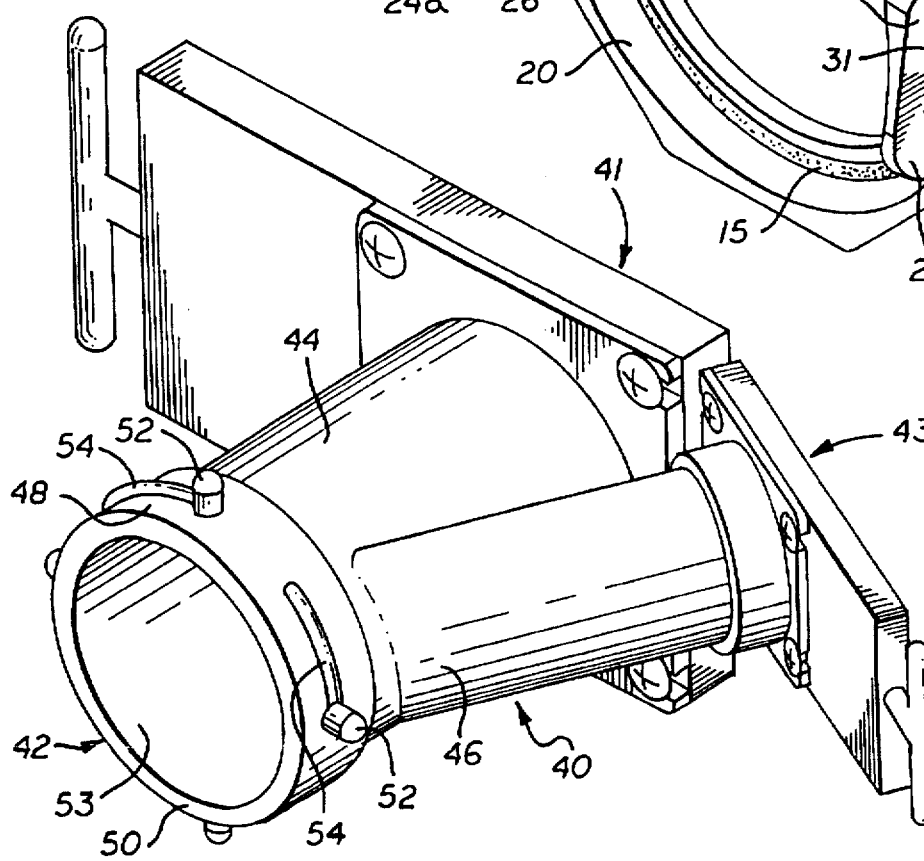

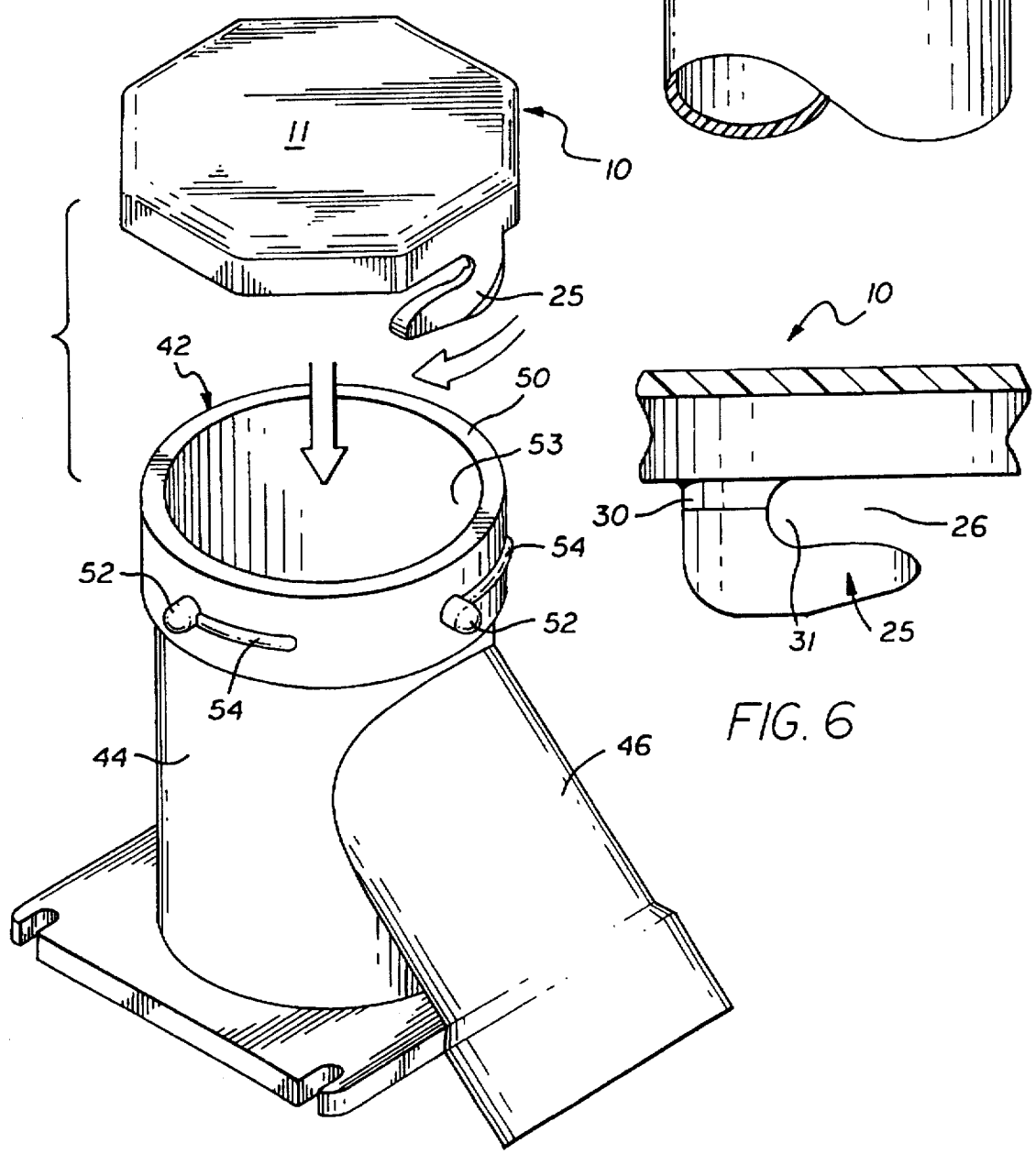

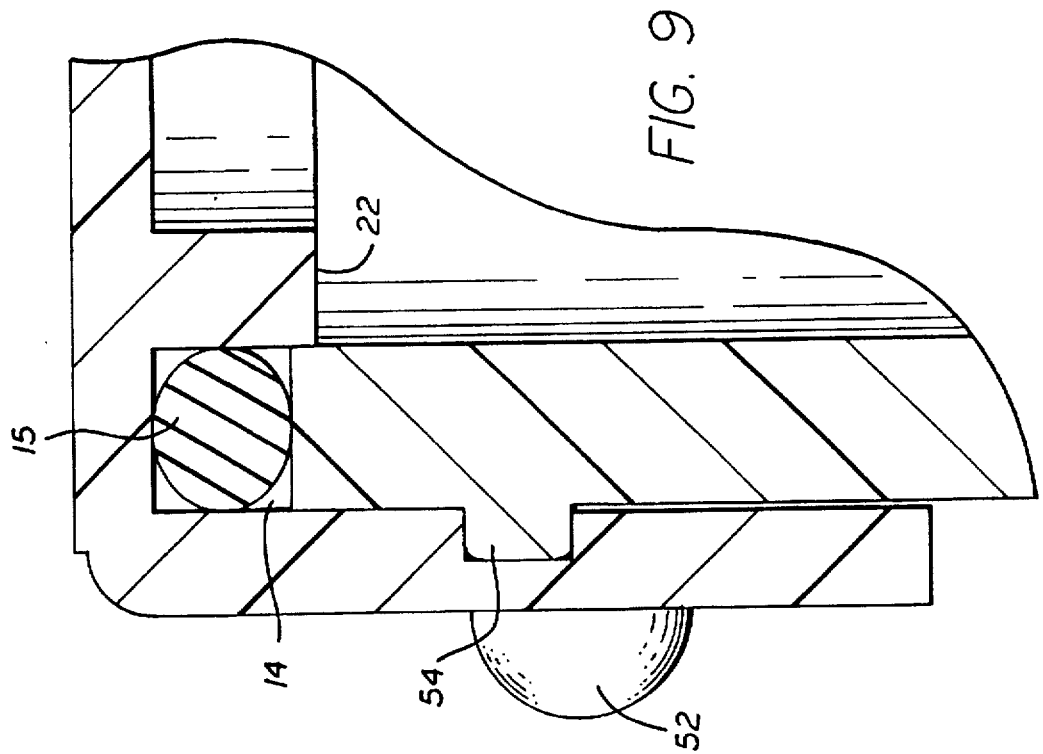
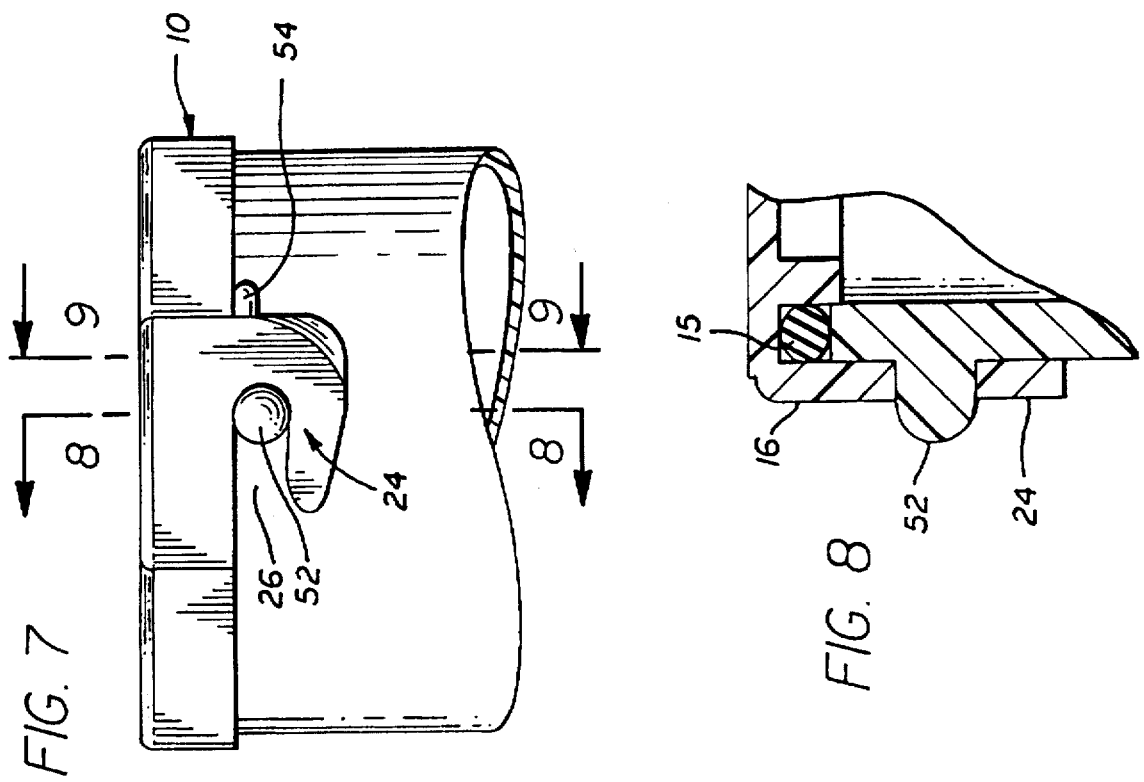

VALVE ADAPTER LOCKING SYSTEM

BACKGROUND OF THE INVENTION

1. Field of the Invention

The present invention relates generally to the field of plumbing and recreational vehicle ("RV") waste disposal, and more particularly to a safety locking device to secure a cap to a hose adapter used in conjunction with a waste removal valve assembly to prevent inadvertent sewer spillage.

2. Description of the Prior Art

Various types of devices are employed to tightly connect a closure cap to the hose adapter section of a waste removal valve assembly to secure against sewer seepage or spillage. Common among these devices is the bayonet-type locking mechanism which employs a hook and a pin rotatably mated in a locking relationship to connect and secure two separate components. Another example of this kind of device includes a threaded cap or lid that can be screwed on to the corresponding threaded end of a hose adapter and then tightened.

There are several draw backs associated with these devices. Specifically, the threaded cap generally takes longer to secure and tighten and could "freeze up", making it extremely difficult, if not impossible, to remove without the use of the proper tools. The manufacturing costs are also higher for this device. The bayonet-type locking mechanism, though one of the more commonly used of these devices, includes components that could break if employed improperly or subjected to excessive stress. If either the locking pin or the hook component should break, and the hook component is inclined at times to break along its base, the means to secure the cap to the hose adapter would be lost. In this event, and in the absence of a tight and secure seal between the two components, sewage and waste from the RV is likely to seep or spill out and create an extremely messy and unsanitary condition around and in the wake of the vehicle.

Most back-up or safety devices that would ensure the seal and secure the connection between the cap and the hose adapter will almost certainly add substantially to the cost of production of these items and ultimately to the wholesale and retail purchase prices. Such devices often include components that are more complex in their design and function. Also, the amount of time necessary to attach and secure these components together is typically greater.

The device of the present invention addresses and resolves the problem presented by the prior art by providing a cost-effective and efficient means to preserve the connection and tight seal between the cap and the hose adapter and still preclude any waste spillage, even in the event of a break of one or both of the principal locking components.

SUMMARY OF THE INVENTION

The present invention provides an apparatus for attaching and securing a cap to a hose adapter used in connection with a waste removal valve assembly on an RV or under similar circumstances to prevent inadvertent sewer or waste spillage in the event of a failure of the primary locking components.

Accordingly, in an exemplary embodiment of the present invention, the apparatus comprises two principal components. One component is a Y-branch plumbing fitting, such as a hose adapter used with an RV waste removal valve assembly. On the outside surface at one end of the fitting are a coupling pin and an adjacently located coupling tongue or rib. The other component is a closure cap, which includes one or more generally L-shaped coupling arms. The coupling arms form a U-shaped opening with the edge of the cap and include an opening at one end to slidably receive the coupling pin and a grooved or slotted portion along the base of the coupling arm near where the arm attaches to the edge of the cap to slidably receive the coupling tongue.

The back-up security feature of the present invention is employed when the coupling pins and the corresponding open end of the coupling arms are aligned and one or both of these fitting components are rotated towards the other to enable the pins to engage the openings and each of the coupling grooves or slots to engage the corresponding coupling tongues to lock the fittings together. Should any portion of the L-shaped coupling arm or pin break off, the cap and the hose adapter would remain securely held together due to the strong bond established by the connection between the tongue and groove joint.

Accordingly, it is an object of the present invention to provide an improved apparatus for attaching and securing a closure cap to a hose adapter used in connection with an RV waste removal valve assembly to prevent inadvertent sewer or waste spillage.

It is a further object of the present invention to provide an improved apparatus for ensuring the tight connection between a closure cap and a hose adapter used in connection with an RV waste removal valve assembly in the event of the failure of one or both of the main locking components.

It is another object of the present invention to provide an improved apparatus for attaching and securing a closure cap to a hose adapter used in connection with an RV waste removal valve assembly that is simple to use and economical to manufacture.

Other objects and advantages of the present invention will become apparent in the following specifications when considered in light of the attached drawings wherein the preferred embodiment of the invention is illustrated.

BRIEF DESCRIPTION OF THE DRAWINGS

FIG. 1 is a top perspective view of the closure cap component of the present invention.

FIG. 2 is a bottom perspective view of the closure cap component of the present invention.

FIG. 3 is a perspective view of the hose adapter fitting component of the present invention shown in conjunction with an RV waste removal valve assembly.

FIG. 4 is an enlarged sectional view of the hose adapter fitting component showing the coupling pin and the adjacently located coupling tongue.

FIG. 5 is a perspective view of the closure cap and the hose adapter fitting demonstrating the sequence of movements for connecting the two components and specifically for engaging the coupling arms with the corresponding coupling pins and the coupling tongues with the corresponding coupling groove.

FIG. 6 is a sectional view taken along line 6—6 of FIG. 1.

FIG. 7 is a side sectional view of the closure cap fully engaged with the hose adapter fitting.

FIG. 8 is a sectional view taken along line 8—8 of FIG. 7.

FIG. 9 is a sectional view taken along line 9—9 of FIG. 7.

DETAILED DESCRIPTION OF THE PREFERRED EMBODIMENT

The present invention relates to an apparatus for connecting and tightly securing a closure cap to a hose adapter employed in connection with an RV waste removal valve assembly (FIG. 3) or some other similar or related apparatus to prevent inadvertent sewer or waste spillage, as illustrated in FIGS. 1-9.

Closure cap 10 comprises end wall 11, which includes an outside surface 12 and an inside surface 13, and a continuous sidewall 16 having an outside surface 18 and an inside surface 20. Integrally formed with the inside surface 13 is a projecting rim 22, which, together with the inside surface 20, defines a circumferential channel 14. Inside channel 14 is a gasket 15, which provides for a better and more secure seal between closure cap 10 and hose adapter 42. Attached to the inside edge 17 of sidewall 16 are generally L-shaped arm members 24, 25. Each of the arm members 24, 25 includes an opening 26 at one end, a slot 31, a base portion 28 at the opposite end and an outside surface 27 and inside surface 29. To facilitate the initial engagement of the closure cap 10 to a hose adapter 42, ends 24a, 25a of respective arm members 24,25 are slightly tapered, the narrowest part of the taper being located adjacent to opening 26.

A coupling groove 30 is formed along the length of the inside surface 29 of each base portion 28. Coupling groove 30, though generally uniform in its width, can also be produced with a wider opening at one end tapering to a narrower opening at the other end.

Valve assembly 40 is a Y-branch fitting that includes a first fitting 44 and a second fitting 46. First fitting 44 includes the hose adapter 42 at one end having an outer wall 48, a continuous edge 50 and an opening 53. Integrally formed with the outer wall 48 are a plurality of elements, including coupling pin 52 and an adjacently located coupling tongue 54. Connected to the opposite end of first fitting 44 is a gate valve 41, which is employed for the release of toilet and other kinds of solid waste and the like. Gate valve 43 is connected to the corresponding end of second fitting 46 for the release of gray water waste.

Typical dimensions of the individual components of an RV waste removal valve assembly, which incorporates the elements of the present invention, are as follows:

- Valve assembly 40 is generally eight (8) inches in height, about fifteen (15) inches in length, and approximately four (4) inches in width.
- The dimensions of the pipes used to form fittings 44, 46 range from about two and one-half (2½) inches for the gray water plumbing, i.e. fitting 46, to approximately four (4) inches for the plumbing component used for the solid and other waste disposal, i.e. fitting 44.
- Coupling pin 52 has a length and a diameter of about one-third (⅓) of an inch.
- Coupling tongue 54 has a length of about one (1) inch, a width of about one-fifth (⅕) of an inch and a thickness or depth of about one-tenth (⅒) of an inch.
- The length of the longer of the two sections of L-shaped coupling arms 24,25 is approximately one and one-quarter (1¼) inches. The shorter sections of the coupling arms 24, 25 are about one (1) inch in length. The opening formed by the two sections of the coupling arms 24,25 is approximately one-quarter (¼) inch wide.
- The coupling groove 30, which is formed from the inside surface 29 of the base of each of the coupling arms 24,25 has a length of approximately two-fifth (⅖) of an inch, a depth of about one-fifth (⅕) of an inch and a width of approximately one-eighth (⅛) of an inch.
- The diameter of the closure cap 10 is approximately three and three-quarters (3¾) inches and the thickness is about three-fifths (⅗) of an inch.

All of the foregoing dimensions are subject to modification depending upon the particular objectives of the invention and any other factors that would have the effect of dictating differing size requirements.

In a typing application of the present invention, as shown in FIG. 5, closure cap 10 is situated over the opening 53 of hose adapter 42 with edge 50 positioned in proper alignment with channel 14 (see FIG. 2). Closure cap 10 may then be rotated to enable the opening 26 to engage the coupling pin 52 and cause it to slide all the way to the back of slot 31. As the fittings are rotated, the coupling tongue 54 engages coupling groove 30, where the coupling tongue 54 enters and seats itself in a secure and tightly fitted position. A tapered coupling groove would allow for an even tighter fit for the coupling tongue 54.

Should substantially all or even a small section of one or more of the coupling arms 24, 25 break off by accident or misuse, the connection between the closure cap 10 and the hose adapter 42 will nevertheless remain secure and tight. This results from the remaining connection between the coupling tongue 54 and the coupling groove 30, which acts to preserve the integrity of the secure connection between the two principal components, namely the closure cap 10 and the hose adapter 42.

All the components of the present invention are generally produced from plastic or some other light synthetic material. Gasket 15 can also be made from rubber.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

I claim:

1. A device for locking fitting components comprising:
   a first-fitting member having a continuous side wall, said side wall including an interior surface and an exterior surface, and at least one first coupling means joined to the exterior surface, each of said first coupling means including a coupling pin and a coupling tongue;
   a second fitting member having a continuous side wall with an exterior surface and an interior surface, and an inside edge, said second-fitting member including at least one generally L-shaped coupling arms joined thereto, each of said arms having a first end adjacent to an opening conformed to slidably receive said coupling pin and a second end joined to the inside edge, said joined second end having a base portion forming a coupling groove conformed to slidably receive said coupling tongue;
   and the first fitting member and the second fitting member are connected and secured to each other by aligning each of the coupling pins with the opening corresponding to each of the coupling arms and rotating at least one of said first and second fitting members to engage each coupling arm with a corresponding coupling pin and each coupling groove with a corresponding coupling tongue.

2. The invention of claim 1, wherein the second fitting member includes an inside surface and a projecting rim integrally formed with said inside surface to form a circumferential channel.

3. The invention of claim 2 comprising a gasket inside said channel.

4. The invention of claim 1 wherein the coupling pin and the coupling tongue are adjacent to each other.

* * * * *